(12) United States Patent
Ota et al.

(10) Patent No.: US 11,124,044 B2
(45) Date of Patent: Sep. 21, 2021

(54) AIR CONDITIONER

(71) Applicant: DENSO CORPORATION, Kariya (JP)

(72) Inventors: Takayuki Ota, Kariya (JP); Shin Nishida, Kariya (JP); Takashi Danjo, Kariya (JP)

(73) Assignee: DENSO CORPORATION, Kariya (JP)

( * ) Notice: Subject to any disclaimer, the term of this patent is extended or adjusted under 35 U.S.C. 154(b) by 166 days.

(21) Appl. No.: 16/381,357

(22) Filed: Apr. 11, 2019

(65) Prior Publication Data
US 2019/0275855 A1    Sep. 12, 2019

Related U.S. Application Data

(63) Continuation of application No. PCT/JP2017/032641, filed on Sep. 11, 2017.

(30) Foreign Application Priority Data

Oct. 24, 2016 (JP) .............................. JP2016-207526

(51) Int. Cl.
*B60H 1/00* (2006.01)
*B60H 1/32* (2006.01)
(Continued)

(52) U.S. Cl.
CPC ......... *B60H 1/005* (2013.01); *B60H 1/00335* (2013.01); *B60H 1/32* (2013.01);
(Continued)

(58) Field of Classification Search
CPC ...... B60H 1/005; B60H 1/00335; B60H 1/32; B60H 1/3205; B60H 2001/3285;
(Continued)

(56) References Cited

U.S. PATENT DOCUMENTS 4,748,823 A * 6/1988 Asano .................... B60H 1/005
62/239
6,854,513 B2 * 2/2005 Shirota .................. F28D 20/02
165/203

(Continued)

FOREIGN PATENT DOCUMENTS

JP    2003320842 A    11/2003
JP    2007113904 A    5/2007
(Continued)

*Primary Examiner* — Marc E Norman
(74) *Attorney, Agent, or Firm* — Harness, Dickey & Pierce, P.L.C.

(57) ABSTRACT

An air conditioner includes a circulation flow channel in which a refrigerant circulates, an evaporator provided in the circulation flow channel to cool air by heat exchange with the refrigerant passing through the circulation flow channel, a first cold storage unit provided in the evaporator at a position adjacent to a tube in which the refrigerant flows in the evaporator, and a second cold storage unit provided in the circulation flow channel at a position different from the evaporator. The first cold storage unit is configured to store therein a first cold storage material which changes in phase by the heat exchange with the refrigerant passing through the tube, and the second cold storage unit is configured to store therein a second cold storage material which changes in phase by the heat exchange with the refrigerant passing through the circulation flow channel.

10 Claims, 11 Drawing Sheets

(51) Int. Cl.
  *F28D 20/02*  (2006.01)
  *F25B 39/02*  (2006.01)
  *F24F 5/00*  (2006.01)
  *F28D 1/053*  (2006.01)

(52) U.S. Cl.
  CPC ............ *B60H 1/3205* (2013.01); *F24F 5/00* (2013.01); *F25B 39/02* (2013.01); *F28D 1/053* (2013.01); *F28D 20/02* (2013.01); *B60H 2001/3285* (2013.01); *Y02E 60/14* (2013.01)

(58) Field of Classification Search
  CPC .............. F25B 39/02; F25B 2313/0234; F25B 2600/2513; F24F 5/00; F28D 20/02; F25D 14/02; Y02E 60/14
  USPC .................................................. 62/198, 225
  See application file for complete search history.

(56) References Cited

U.S. PATENT DOCUMENTS

| | | |
|---|---|---|
| 2003/0159455 A1 | 8/2003 | Aikawa et al. |
| 2006/0288727 A1 | 12/2006 | Aikawa et al. |
| 2015/0168047 A1 | 6/2015 | Danjyo et al. |
| 2018/0306525 A1* | 10/2018 | Kitou ...................... F28F 1/126 |

FOREIGN PATENT DOCUMENTS

| | | | |
|---|---|---|---|
| JP | 2009077144 A | 4/2009 | |
| JP | 2009229014 A | 10/2009 | |
| JP | 2012-017038 A | 1/2012 | |
| JP | 2013256262 A | 12/2013 | |
| JP | 5582080 B2 | 9/2014 | |

* cited by examiner

AIR CONDITIONER

CROSS REFERENCE TO RELATED APPLICATIONS

The present application is a continuation application of International Patent Application No. PCT/JP2017/032641 filed on Sep. 11, 2017, which designated the United States and claims the benefit of priority from Japanese Patent Application No. 2016-207526 filed on Oct. 24, 2016. The entire disclosures of all of the above applications are incorporated herein by reference.

FIELD OF THE INVENTION

The present disclosure relates to an air conditioner.

BACKGROUND

An air conditioner is equipped with an evaporator as a part of a refrigeration cycle. The evaporator evaporates a liquid phase refrigerant, and cools air by heat exchange with the refrigerant.

In a vehicle air conditioner, a compressor may be operated by a driving force of an internal combustion engine, to thereby circulate a refrigerant in a refrigeration cycle. For that reason, in a state where an internal combustion engine is stopped, since the circulation of the refrigerant is stopped, the air passing through the evaporator cannot be cooled.

In recent years, vehicles that automatically stop the internal combustion engine at the time of a temporary stop or the like, that is, perform so-called idle stop, have become widespread. In such a vehicle, the internal combustion engine is stopped relatively frequently during operation, and the compressor is stopped each time. At this time, if the cooling of the air is not performed as described above, a temperature in a vehicle interior rises thereby causing an occupant to have a discomfort feeling.

SUMMARY

According to an aspect of the present disclosure, an air conditioner may include: a circulation flow channel in which a refrigerant circulates; an evaporator provided in the circulation flow channel to cool air by heat exchange with the refrigerant passing through the circulation flow channel; a first cold storage unit that is provided in the evaporator at a position adjacent to a tube in which the refrigerant flows in the evaporator, and is configured to store therein a first cold storage material which changes in phase by the heat exchange with the refrigerant passing through the tube; and a second cold storage unit that is provided in the circulation flow channel at a position different from the evaporator, and is configured to store therein a second cold storage material which changes in phase by the heat exchange with the refrigerant passing through the circulation flow channel.

DESCRIPTION OF EMBODIMENTS

Figure 1:
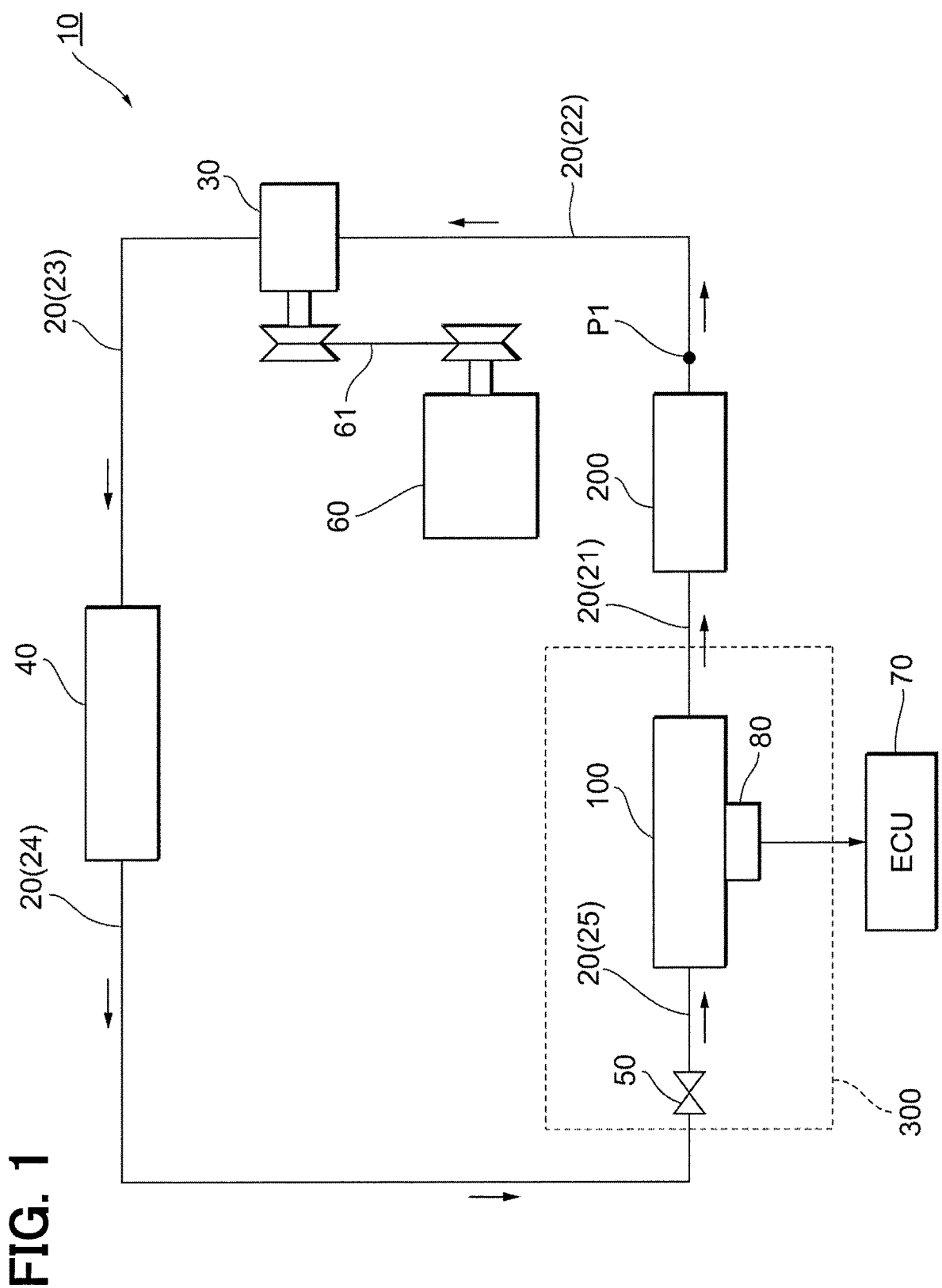
FIG. 1 is a diagram schematically showing an overall configuration of an air conditioner according to a first embodiment.

An evaporator may be configured with a cold storage material such as paraffin. The cold storage material may be accommodated inside a container, and the container may be disposed adjacent to a tube or the like of the evaporator through which a refrigerant passes. According to an air conditioner provided with the evaporator configured as described above, the air passing through the evaporator may be cooled even during a period in which an internal combustion engine is stopped.

For example, an unloading period (about 3 minutes) of a home delivery vehicle is longer than a signal waiting period (about 1 minute) during which an automatic idle stop is performed. In order to reduce a wasteful fuel consumption, it may be preferable to adopt a configuration in which the air in the evaporator can be cooled in a state in which the internal combustion engine is stopped even in such a long period. In order to cool the air in the evaporator over a long period of time, for example, there is a need to increase the number of containers of the cold storage material so as to accommodate a larger number of cold storage materials.

However, if the cold storage material is increased too much, a flow of air in the evaporator may be obstructed by the containers of the cold storage material and a flow rate of the air passing through the evaporator may be reduced. As a result, a cooling performance of the air conditioner may be deteriorated. In order to secure the cooling performance with the use of a large number of cold storage materials, it is necessary to increase a size of the evaporator, but such a configuration may be not preferable in view of the mountability to the vehicle.

The present disclosure is to provide an air conditioner capable of restraining an increase in the size of an evaporator while maintaining a configuration in which cooling of air in the evaporator can be continued for a long period of time by a cold storage material after the circulation of a refrigerant has been stopped.

For example, in an air conditioner according to at least one of the following embodiments, when a refrigerant circulates in a circulation flow channel, both of a first cold storage material and a second cold storage material are cooled by the refrigerant and solidified. Thereafter, when the circulation of the refrigerant in the circulation flow channel is stopped, the air passing through the evaporator is cooled by the first cold storage material of the first cold storage unit.

The first cold storage material is heated by air and melted, and a temperature of the first cold storage material gradually rises.

The second cold storage unit is disposed at a position different from that of the evaporator through which the air passes. For that reason, even after the temperature of the first cold storage material rises, the second cold storage material of the second cold storage unit remains solidified for a while. Meanwhile, in the second cold storage unit, the refrigerant is cooled by the second cold storage material. The refrigerant, which has become in a low temperature, is supplied to the evaporator through the circulation flow channel, and cools the air passing through the evaporator. In other words, the air passing through the evaporator is not only cooled by the first cold storage material of the first cold storage unit but also cooled by the second cold storage material of the second cold storage unit. For that reason, according to the air conditioner of the present disclosure, the air can be cooled for a long period of time even after the circulation of the refrigerant is stopped.

As described above, the second cold storage unit is disposed at a position different from that of the evaporator. Thus, the evaporator is not increased in size due to the configuration in which the second cold storage unit is provided and more cold storage material is used.

As a result, an air conditioner capable of reducing the size of the evaporator is provided while the cooling of the air in the evaporator can be continued for a long period of time by the cold storage material in a state in which the circulation of the refrigerant is stopped.

Hereinafter, the detail embodiment will be described with reference to the accompanying drawings. In order to facilitate understanding of a description, the same reference numerals are assigned to the identical components in the respective drawings as much as possible, and a repetitive description of the identical components will be omitted.

A configuration of an air conditioner 10 according to a first embodiment will be described. The air conditioner 10 is configured as an apparatus for performing air conditioning of a vehicle interior in a vehicle (which is not shown in the entirety). As shown in FIG. 1, the air conditioner 10 includes a circulation flow channel 20, a compressor 30, a condenser 40, an expansion valve 50, an evaporator 100, a cold storage unit 200, and a control unit 70.

The circulation flow channel 20 is a flow channel through which a refrigerant circulates, and is configured by a pipe formed in an annular shape. The compressor 30, the condenser 40, the expansion valve 50, and the evaporator 100, all of which will be described later, are disposed along the circulation flow channel 20, and those components configure a refrigeration cycle as a whole.

The circulation flow channel 20 includes a pipe 21, a pipe 22, a pipe 23, a pipe 24, and a pipe 25. The pipe 21 is a portion of the circulation flow channel 20, which connects the evaporator 100 and the cold storage unit 200. The pipe 22 is a portion of the circulation flow channel 20, which connects the cold storage unit 200 and the compressor 30. The pipe 23 is a portion of the circulation flow channel 20, which connects the compressor 30 and the condenser 40. The pipe 24 is a portion of the circulation flow channel 20, which connects the condenser 40 and the expansion valve 50. The pipe 25 is a portion of the circulation flow channel 20, which connects the expansion valve 50 and the evaporator 100. In FIG. 1, a direction in which the refrigerant circulates in the circulation flow channel 20 is indicated with the use of multiple arrows.

The compressor 30 is a device for pumping and circulating the refrigerant in the circulation flow channel 20. When the compressor 30 is driven, the refrigerant is drawn from the pipe 22 to the compressor 30, and the refrigerant is compressed inside the compressor 30. The refrigerant compressed by the compressor 30 to a high temperature and high pressure is sent out to the condenser 40 through the pipe 23.

In the present embodiment, a driving force of an internal combustion engine 60 provided in the vehicle is transmitted to the compressor 30 by a pulley belt 61, to thereby drive the compressor 30. For that reason, when the internal combustion engine 60 is stopped due to an automatic idle stop or the like, the operation of the compressor 30 is stopped, and the circulation of the refrigerant in the circulation flow channel 20 is also stopped.

The compressor 30 is provided with an electromagnetic clutch (not shown). For that reason, even when the internal combustion engine 60 is operating, the operation of the compressor 30 can be stopped by turning off the electromagnetic clutch. The operation of the electromagnetic clutch is controlled by a control unit 70, which will be described later.

The condenser 40 is a heat exchanger for changing the refrigerant from a gas phase to a liquid phase by exchanging a heat between the refrigerant circulating in the circulation flow channel 20 with air. A gas-phase refrigerant supplied from the pipe 23 to the condenser 40 is condensed by being deprived of the heat by the air passing through the condenser 40, and becomes a liquid-phase refrigerant. The liquid-phase refrigerant passes through the pipe 24 to the expansion valve 50.

The expansion valve 50 reduces a pressure of the refrigerant passing through the expansion valve 50 by throttling a flow channel cross-sectional area of the circulation flow channel 20 at a position on the upstream side of the evaporator 100. The expansion valve 50 includes a diaphragm not shown, and is configured so as to automatically vary an opening degree of the expansion valve 50 based on a temperature of the refrigerant which is in contact with the diaphragm.

Figure 3:
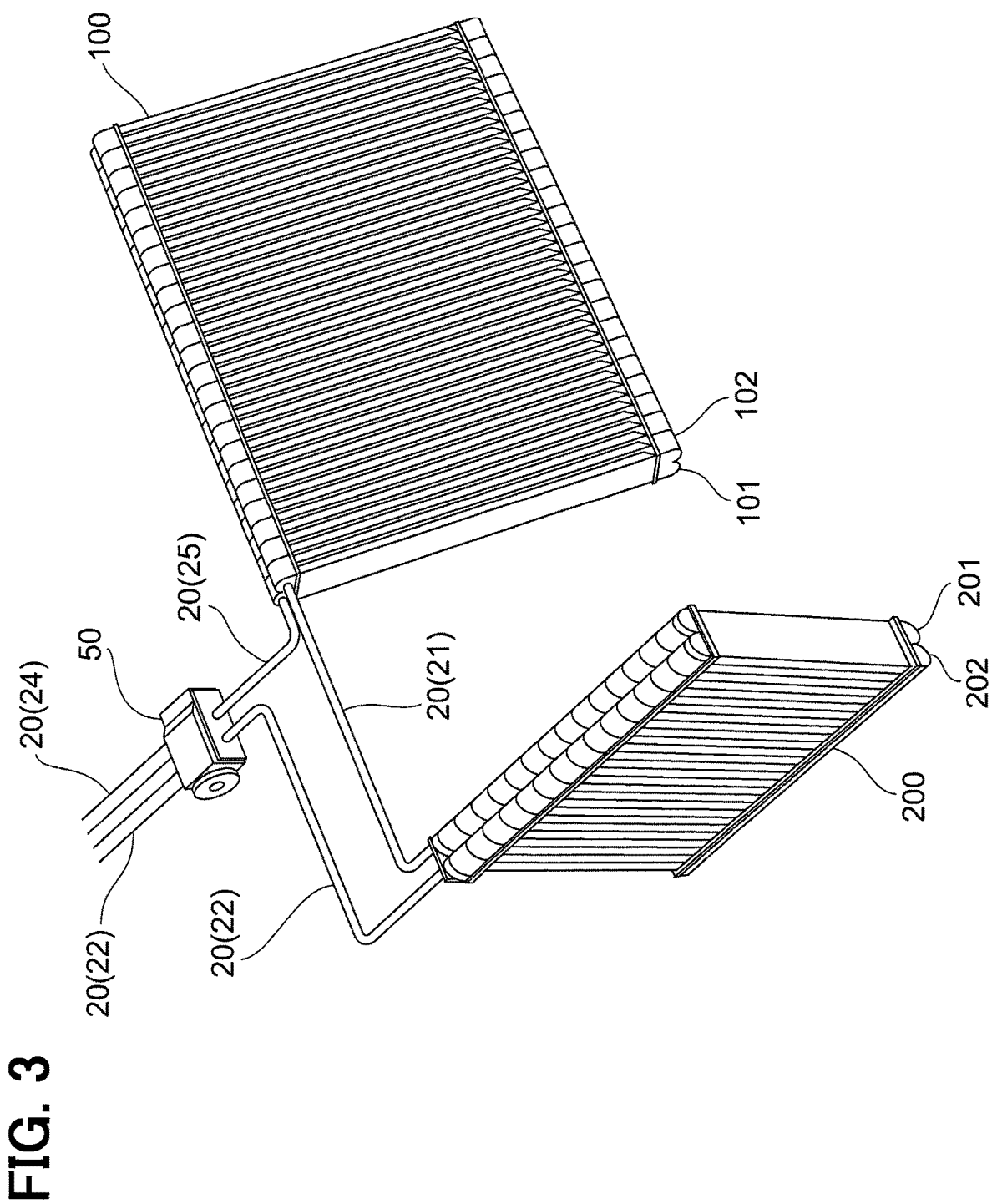
FIG. 3 is a perspective view showing the configurations of an evaporator, a cold storage unit, and an expansion valve.

In FIG. 1, the expansion valve 50 and the pipe 22 are shown at positions separated from each other, but in reality, the refrigerant flowing through the pipe 22 is configured to pass through the expansion valve 50 (refer to FIG. 3). In FIG. 1, a portion of the pipe 22, which passes through the expansion valve 50, is indicated as a point P1. The refrigerant flowing through the pipe 22 comes into contact with the diaphragm when passing through the expansion valve 50.

In other words, the expansion valve 50 is configured to automatically change the opening degree in accordance with the temperature of the refrigerant at a position (point P1) on the downstream side of the cold storage unit 200 in the circulation flow channel 20. Specifically, the opening degree of the expansion valve 50 increases as the temperature of the refrigerant at the point P1 increases. The portion indicated by the point P1 corresponds to a so-called "temperature sensing unit" of the expansion valve 50. In the configuration described above, the refrigerant having a lower temperature can be supplied to the cold storage unit 200, as compared with a configuration in which the opening degree of the expansion valve 50 is adjusted in accordance with the temperature of the refrigerant passing through the pipe 21, for example.

As a specific configuration of the expansion valve 50 having the diaphragm, a known configuration can be adopted, and therefore, a detailed illustration and description of the specific configuration will be omitted.

The evaporator 100 is a heat exchanger for changing the refrigerant from a liquid phase to a gas phase by exchanging the heat between the refrigerant circulating in the circulation flow channel 20 with the air. The liquid-phase refrigerant supplied from the pipe 25 to the evaporator 100 deprives the air passing through the evaporator 100 of the heat and evaporates into a gas-phase refrigerant. The gas-phase refrigerant passes through the pipe 21 to the cold storage unit 200.

The air passing through the evaporator 100 is cooled by being deprived of the heat from the refrigerant and lowers a temperature of the air. The low-temperature air is blown out into the vehicle interior as air conditioning wind. As a result, cooling of the vehicle interior is performed. The evaporator 100 is provided with a temperature sensor 80 for measuring a surface temperature of the evaporator 100 (specifically, a temperature of fins 140 to be described later). A more specific configuration of the evaporator 100 will be described later.

The cold storage unit 200 is a unit in which a second cold storage material PF2 (refer to FIG. 6) is accommodated. In the present embodiment, paraffin is used as the second cold storage material PF2. When the refrigerant circulates in the circulation flow channel 20, the second cold storage material PF2 is cooled by the refrigerant (low in temperature) and solidified. The specific configuration and function of the cold storage unit 200 will be described later.

The control unit 70 is a computer system for controlling the overall operation of the air conditioner 10. Various types of information, such as the surface temperature of the evaporator 100 measured by the temperature sensor 80, are input to the control unit 70. As described above, the control unit 70 controls the operation of an electromagnetic clutch provided in the compressor 30.

Various types of control performed by the control unit 70 include so-called "frost control". The frost control is a control for adjusting the operation of the compressor 30 (specifically, the electromagnetic clutch) so as not to cause freezing of a condensed water on a surface of the evaporator 100. In the frost control, when the surface temperature of the evaporator 100 measured by the temperature sensor 80 falls below a predetermined lower limit temperature, the electromagnetic clutch is turned off. As a result, the circulation of the refrigerant in the circulation flow channel 20 stops, and the surface temperature of the evaporator 100 rises. Under the frost control described above, the surface temperature of the evaporator 100 is prevented from becoming 0° C. or lower, and a condensed water in the evaporator 100 is prevented from being frozen.

In FIG. 1, a dotted line indicates an air conditioning mechanism 300. The air conditioning mechanism 300 is a mechanism for generating a conditioned air and supplying the generated air conditioning wind to the vehicle interior, and the evaporator 100 is accommodated in the air conditioning mechanism 300. A configuration of the air conditioning mechanism 300 will be described with reference to FIG. 2.

The air conditioning mechanism 300 includes a case 310, a blower 301, a heater core 320, and air mixing doors 331 and 332.

Figure 2:
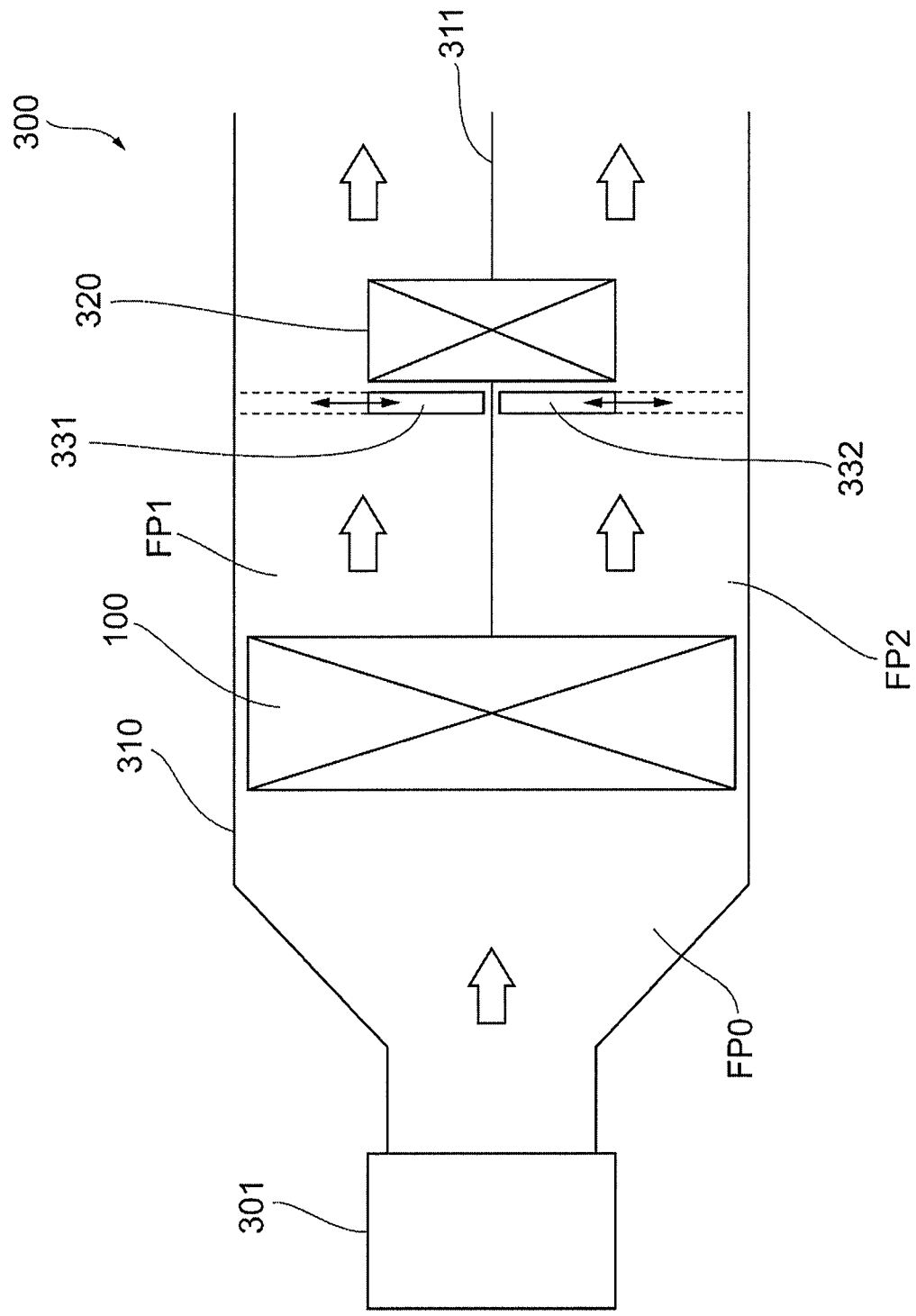
FIG. 2 is a diagram showing a specific configuration of an air conditioning mechanism.

The case 310 is a cylindrical member in which a flow channel through which the air flows is provided. The evaporator 100 described above is accommodated in the case 310. In FIG. 2, a portion of the flow channel provided in the case 310 on the upstream side (left side in FIG. 2) of the evaporator 100 is indicated by a flow channel FP0. In the present embodiment, all of the air passing through the inside of the case 310 passes through the evaporator 100.

A portion of the flow channel provided in the case 310 on the downstream side (right side in FIG. 2) of the evaporator 100 is divided into two flow channels (FP1, FP2) by a partition wall 311. A part of the air that has passed through the evaporator 100 flows into the flow channel FP1, and the remaining part flows into the flow channel FP2. The air conditioning wind from the flow channel FP1 and the air conditioning wind from the flow channel FP2 are blown out toward positions different from each other in the vehicle interior. For example, the air conditioning wind from the flow channel FP1 is blown toward a face of an occupant, and the air conditioning wind from the flow channel FP2 is blown toward feet of the occupant.

The blower 301 is a blower for feeding the air into the case 310, and is disposed on an upstream side portion of the case 310. When the blower 301 is operating, outside air or air in the vehicle interior is fed into the case 310, and the air passes through the evaporator 100 and the heater core 320, which will be described later. The operation of the blower 301 is controlled by the control unit 70.

The heater core 320 is a heat exchanger for heating the air, and is disposed at a position on the downstream side of the evaporator 100. The heater core 320 is disposed across the partition wall 311. For that reason, both of the air flowing through the flow channel FP1 and the air flowing through the flow channel FP2 pass through the heater core 320. A coolant water that has passed through the engine and has reached a high temperature is supplied to the heater core 320. In the heater core 320, heat exchange between the coolant water and the air is performed, to thereby heat the air.

The air mixing door 331 is a shutter provided to adjust the amount of air flowing into the heater core 320 in the flow channel FP1. As shown in FIG. 2, a gap is provided between an upper portion of the heater core 320 and an inner peripheral surface of the case 310. When the air mixing door 331 is at a position closest to the partition wall 311 (when the air mixing door 331 is at a lower side in FIG. 2), the air flowing through the flow channel FP1 is fed into the vehicle interior through the gap without all passing through the heater core 320. In this situation, the temperature of the air conditioning wind at this time becomes the lowest, and puts in a so-called "MAX cool" state. On the other hand, when the air mixing door 331 is at a position farthest from the partition wall 311 (when the air mixing door 331 is at an upper side in FIG. 2), the air flowing through the flow channel FP1 is supplied to the vehicle interior after all passing through the heater core 320. In this situation, the temperature of the air conditioning wind at this time becomes the highest, and puts in a so-called "MAX hot" state. The operation of the air mixing door 331 as described above is controlled by the control unit 70.

The air mixing door 332 is a shutter provided to adjust the amount of air flowing into the heater core 320 in the flow channel FP2. As shown in FIG. 2, a gap is provided between the lower portion of the heater core 320 and the inner peripheral surface of the case 310. When the air mixing door 332 is at a position closest to the partition wall 311 (when the air mixing door 332 is at an upper side in FIG. 2), the air flowing through the flow channel FP2 is supplied into the vehicle interior through the gap, without all passing through the heater core 320. In this situation, the temperature of the air conditioning wind at this time becomes the lowest, and puts in a so-called "MAX cool" state.

On the other hand, when the air mixing door 332 is at the farthest position from the partition wall 311 (when the air mixing door 332 is at a lower side in FIG. 2), all of the air flowing through the flow channel FP2 passes through the heater core 320 and then is supplied into the vehicle interior. In this situation, the temperature of the air conditioning wind at this time becomes the highest, and puts in a so-called "MAX hot" state. The operation of the air mixing door 332 as described above is controlled by the control unit 70.

As described above, in the present embodiment, the temperature of the air conditioning wind from the flow channel FP1 and the temperature of the air conditioning wind from the flow channel FP2 can be individually adjusted.

The configurations of the evaporator 100 and the cold storage unit 200 will be described. FIG. 3 is a perspective view of the evaporator 100, the cold storage unit 200, the expansion valve 50, and the circulation flow channel 20 connecting those components to each other. In the drawing, the case 310 and the like configuring the air conditioning mechanism 300 are omitted.

The cold storage unit 200 is placed at a position to which the air passing through the evaporator 100 is not applied, particularly outside the case 310. For that reason, the pipe 21 and the pipe 22 are provided in a bent state as shown in FIG. 3.

The evaporator 100 includes a first heat exchanging unit 101 and a second heat exchanging unit 102, and those units are superimposed on each other along a direction in which the air flows. The configuration of the first heat exchanging unit 101 and the configuration of the second heat exchanging unit 102 are substantially the same as each other. Therefore, hereinafter, only the configuration of the first heat exchanging unit 101 will be described, and a detailed description of the configuration of the second heat exchanging unit 102 will be omitted.

Figure 4:
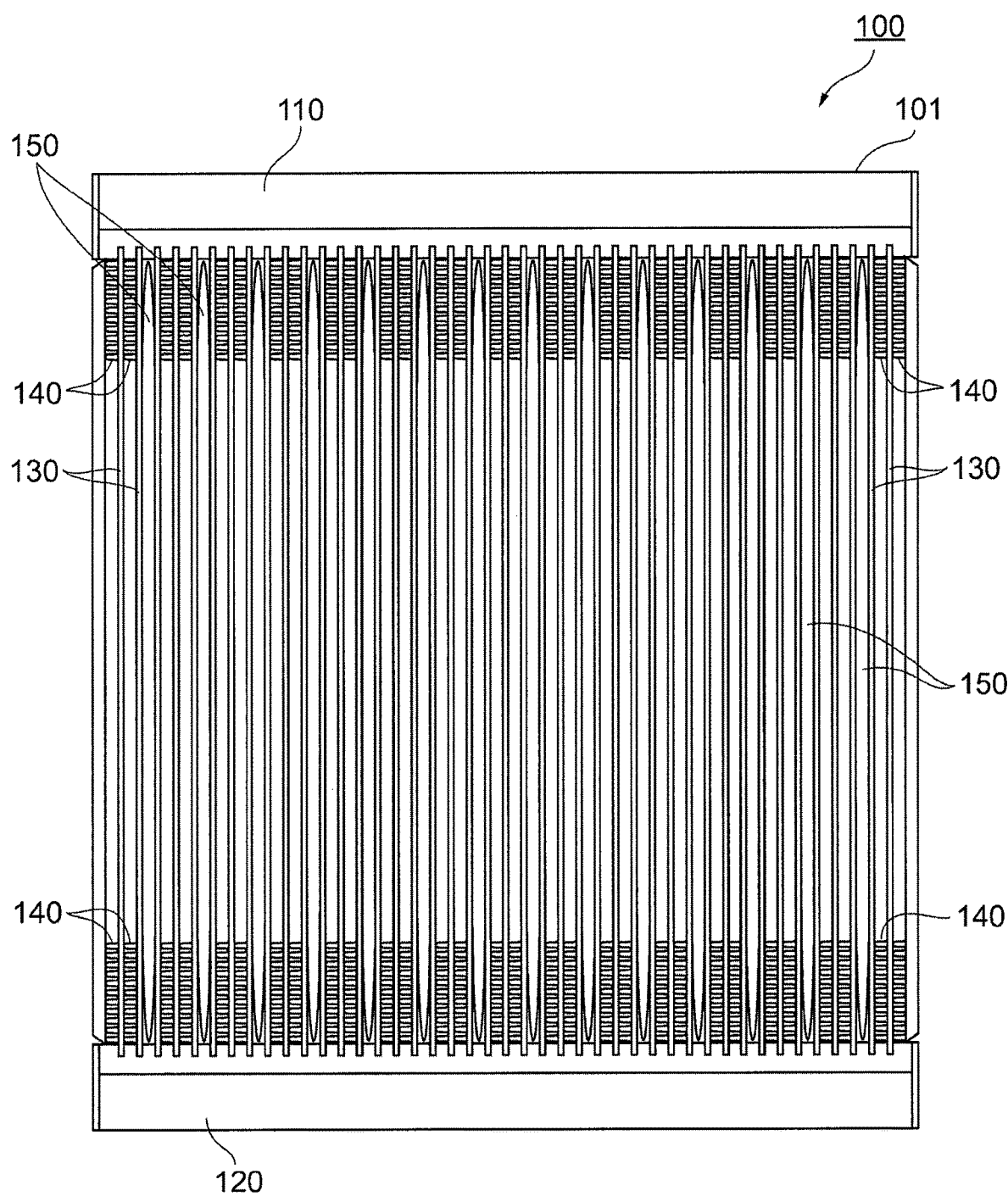
FIG. 4 is a diagram showing a specific configuration of the evaporator.

As shown in FIG. 4, the first heat exchanging unit 101 includes an upper tank 110, a lower tank 120, tubes 130, the fins 140, and cold storage containers 150.

The upper tank 110 is a container for temporarily storing the refrigerant circulating in the circulation flow channel 20 and supplying the refrigerant to the tubes 130. The upper tank 110 is formed as an elongated rod-shaped container. The upper tank 110 is disposed in an upper portion of the first heat exchanging unit 101 in a state in which a longitudinal direction of the upper tank 110 is oriented along a horizontal direction.

The lower tank 120 is a container having substantially the same shape as that of the upper tank 110. The lower tank 120 receives the refrigerant coming from the upper tank 110 through the tubes 130. The lower tank 120 is disposed on the lower portion of the first heat exchanging unit 101 in the same way as that of the upper tank 110 with a longitudinal direction of the lower tank 120 extending in a horizontal direction.

The tubes 130 are elongated pipes each having a flat cross section, and the multiple tubes 130 are provided in the first heat exchanging unit 101. An inside of the tubes 130 is provided with a flow channel extending along a longitudinal direction of the tubes 130. The longitudinal direction of the tubes 130 is perpendicular to the longitudinal direction of the upper tank 110, and the tubes are stacked on each other with in a state where main surfaces of the tubes face each other. A direction in which the multiple stacked tubes 130 are disposed side by side is the same as the longitudinal direction of the upper tank 110.

Each of the tubes 130 has one end connected to the upper tank 110 and the other end connected to the lower tank 120. With the configuration described above, an internal space of the upper tank 110 and an internal space of the lower tank 120 communicate with each other by the flow channels in the respective tubes 130.

The refrigerant travels through the interior of the tubes 130 from the upper tank 110 to the lower tank 120, or from the lower tank 120 to the upper tank 110 (to be described in more detail below). At this time, heat exchange is performed between the refrigerant and the air passing through the evaporator 100.

The fins 140 are formed by folding a metal plate into a wave shape, and are disposed between the respective tubes 130. The apexes of the wavy fins 140 come in contact with and are brazed to outer surfaces of the tubes 130. For that reason, the heat of the air passing through the evaporator 100 is not only transferred to the refrigerant through the tubes 130, but also transferred to the refrigerant through the fins 140 and the tubes 130. In other words, the fins 140 increase a contact area with the air, and the heat exchange between the refrigerant and the air is efficiently performed.

The fins 140 are disposed throughout an entire space provided between two adjacent tubes 130 (except for a portion where the cold storage containers 150 to be described below are located), that is, over an entire range extending from the upper tank 110 to the lower tank 120. However, in FIG. 4, only a part of the above configuration is illustrated, and the other parts are not illustrated.

The cold storage containers 150 perform cold storage when the refrigerant is circulating, and keeps the tubes 130 and the like at a low temperature even after the circulation of the refrigerant is stopped. The cold storage containers 150 are formed as elongated plate-shape containers, and a first cold storage material PF1 (refer to FIG. 6) is stored in the cold storage containers 150. In the present embodiment, paraffin is used as the first cold storage material PF1. Each of the cold storage containers 150 is disposed at a position between two adjacent tubes 130, and is held by the respective tubes 130. In other words, each of the cold storage containers 150 is provided at a position adjacent to the tubes 130 through which the refrigerant passes in the evaporator 100. The first cold storage material PF1 stored in the inside of the cold storage containers 150 undergoes a phase change between a solid phase and a liquid phase by heat exchange with the refrigerant passing through the tubes 130. The cold storage containers 150 correspond to a "first cold storage unit" in the present embodiment.

As shown in FIG. 4, the fins 140 are disposed in one part of multiple spaces provided between the tubes 130, and the cold storage containers 150 are disposed in another part of the spaces. In the present embodiment, the fin 140, the fin 140, and the cold storage container 150 are regularly arranged in a stated order from the left side. However, a relative positional relationship between the fins 140 and the cold storage containers 150 and the regularity of placement of those components are not particularly limited.

A ratio of a cross-sectional area of the cold storage containers 150 to a cross-sectional area of the multiple spaces provided between the tubes 130 when viewed along an air flow direction as shown in FIG. 4 is hereinafter defined as an "occupation ratio of the cold storage material". If the cold storage containers 150 are not disposed and the fins 140 are disposed in all of the spaces provided between the tubes 130, the occupation ratio of the cold storage material is 0%. On the other hand, if the fins 140 are not disposed and the cold storage containers 150 are disposed in all of the spaces between the tubes 130, the occupation ratio of the cold storage material is 100%.

In order to secure the flow of the air passing through the evaporator 100 and to appropriately maintain the cooling performance of the air conditioner 10, it is preferable that the occupation ratio of the cold storage material of the evaporator 100 is within a range of 10% to 50%.

The cold storage unit 200 has the first heat exchanging unit 201 and the second heat exchanging unit 202, and those units are superimposed on each other in the same manner as in the case of the evaporator 100. The configuration of the first heat exchanging unit 201 and the configuration of the second heat exchanging unit 202 are substantially the same as each other. Therefore, hereinafter, only the configuration of the first heat exchanging unit 201 will be described, and a detailed description of the configuration of the second heat exchanging unit 202 will be omitted.

Figure 5:
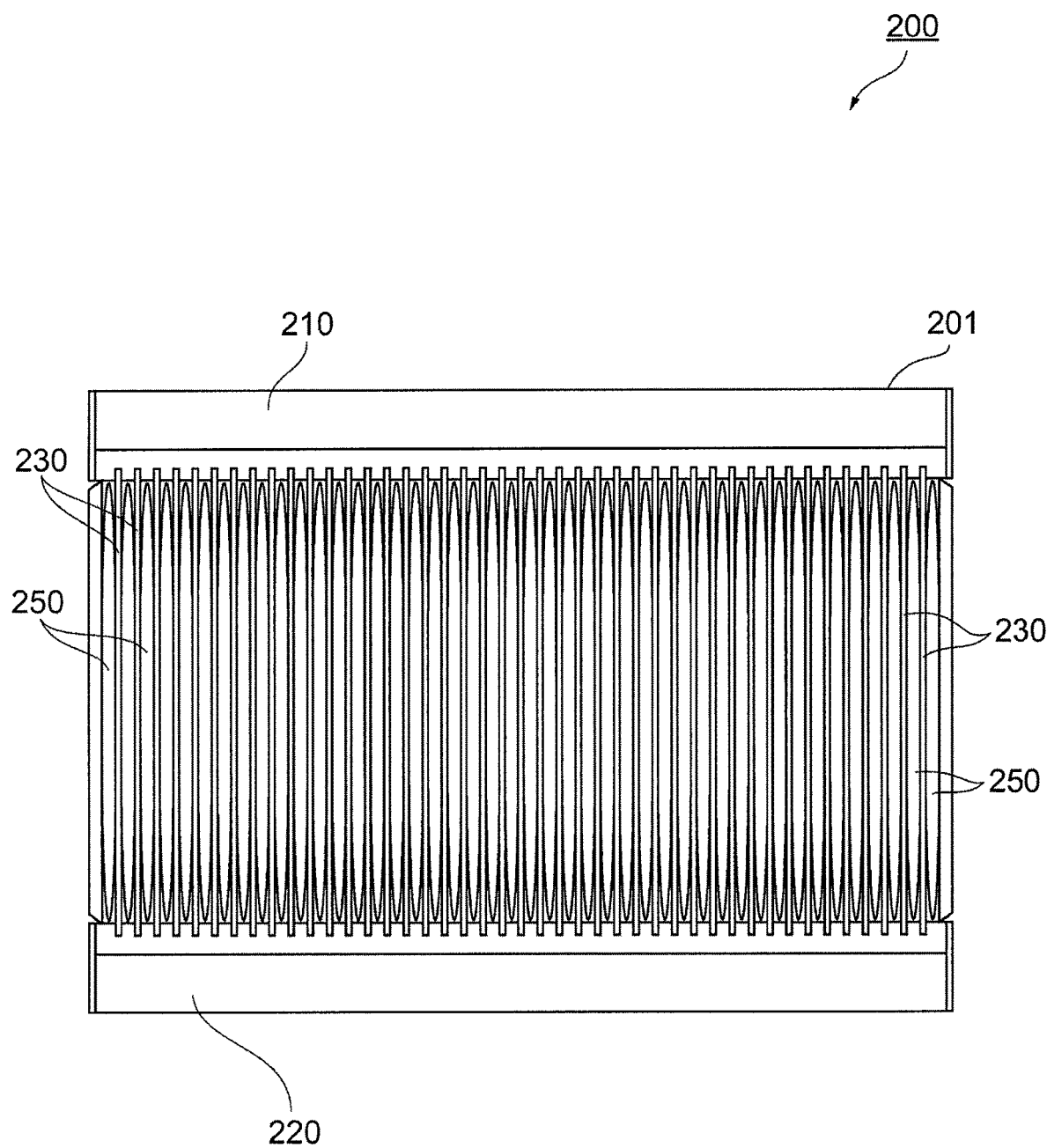
FIG. 5 is a diagram showing a specific configuration of the cold storage unit.

As shown in FIG. 5, the first heat exchanging unit 201 includes an upper tank 210, a lower tank 220, tubes 230, and cold storage containers 250.

The upper tank 210 is a container for temporarily storing the refrigerant circulating in the circulation flow channel 20 and supplying the refrigerant to the tubes 230. The upper tank 210 is formed as an elongated rod-shaped container. The upper tank 210 is disposed in an upper portion of the first heat exchanging unit 201 in a state in which a longitudinal direction of the upper tank 210 is oriented along a horizontal direction.

The lower tank 220 is a container having substantially the same shape as that of the upper tank 210. The lower tank 220 receives the refrigerant coming from the upper tank 210 through the tubes 230. The lower tank 220 is disposed on the lower portion of the first heat exchanging unit 201 in the same way as that of the upper tank 210 with a longitudinal direction of the lower tank 220 extending in a horizontal direction.

The tubes 230 are elongated pipes each having a flat cross section, and the multiple tubes 230 are provided in the first heat exchanging unit 201. An inside of the tubes 230 is provided with a flow channel extending along a longitudinal direction of the tubes 230. The longitudinal direction of the tubes 230 is perpendicular to the longitudinal direction of the upper tank 210, and the tubes are laminated on each other with in a state where main surfaces of the tubes face each other. A direction in which the multiple stacked tubes 230 are disposed side by side is the same as the longitudinal direction of the upper tank 210.

Each of the tubes 230 has one end connected to the upper tank 210 and the other end connected to the lower tank 220. With the configuration described above, an internal space of the upper tank 210 and an internal space of the lower tank 220 communicate with each other by the flow channels in the respective tubes 230.

Each of the cold storage containers 250 is an elongated plate-shape container in which the second cold storage material PF2 described above is stored. The cold storage containers 250 are disposed at positions between two adjacent tubes 230, and are held by the respective tubes 230. In other words, each of the cold storage containers 250 is provided at a position of the cold storage unit 200, which is adjacent to the tubes 230 through which the refrigerant passes. The second cold storage material PF2 stored in the inside of the cold storage container 250 undergoes a phase change between the solid phase and the liquid phase by heat exchange with the refrigerant passing through the tubes 230. The cold storage containers 250 correspond to a "second cold storage unit" in the present embodiment.

Unlike the first heat exchanging unit 101 of the evaporator 100, the first heat exchanging unit 201 of the cold storage unit 200 is not provided with the fins 140. In the first heat exchanging unit 201, the cold storage containers 250 are disposed in all of the spaces provided between the adjacent tubes 230. For that reason, the occupation ratio of the cold storage material in the cold storage unit 200 is 100%. As a result, the amount of the second cold storage material PF2 stored in all of the cold storage containers 250 is larger than the amount of the first cold storage material PF1 stored in all of the cold storage containers 150.

As described above, the first heat exchanging unit 201 of the cold storage unit 200 has substantially the same configuration as that of the first heat exchanging unit 101 in which the occupation ratio of the cold storage material is 100%. However, a dimension of the first heat exchanging unit 201 in a height direction (a distance from the upper tank 210 to the lower tank 220) is smaller than a dimension of the first heat exchanging unit 101 in the height direction.

Figure 6A:
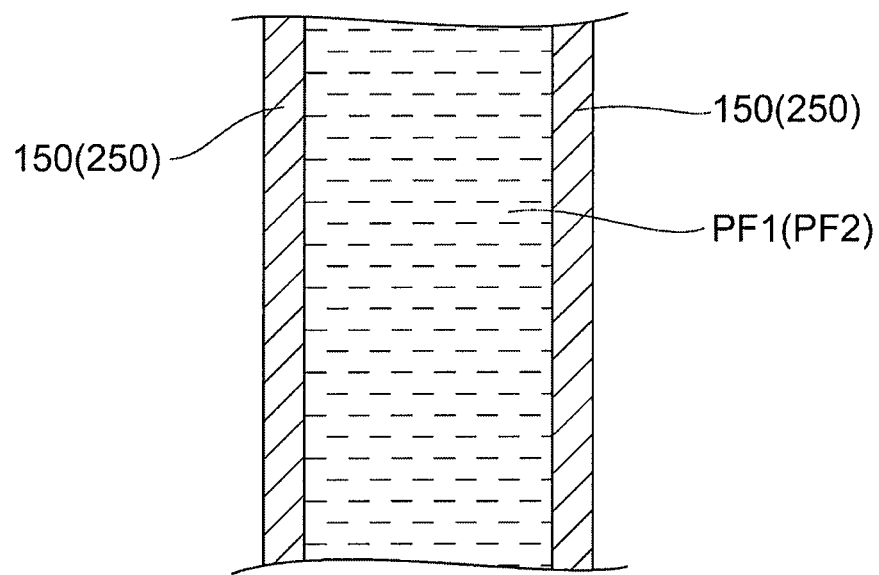
FIG. 6(A) and FIG. 6(B) are cross-sectional views showing an internal configuration of a cold storage container.
Figure 6:
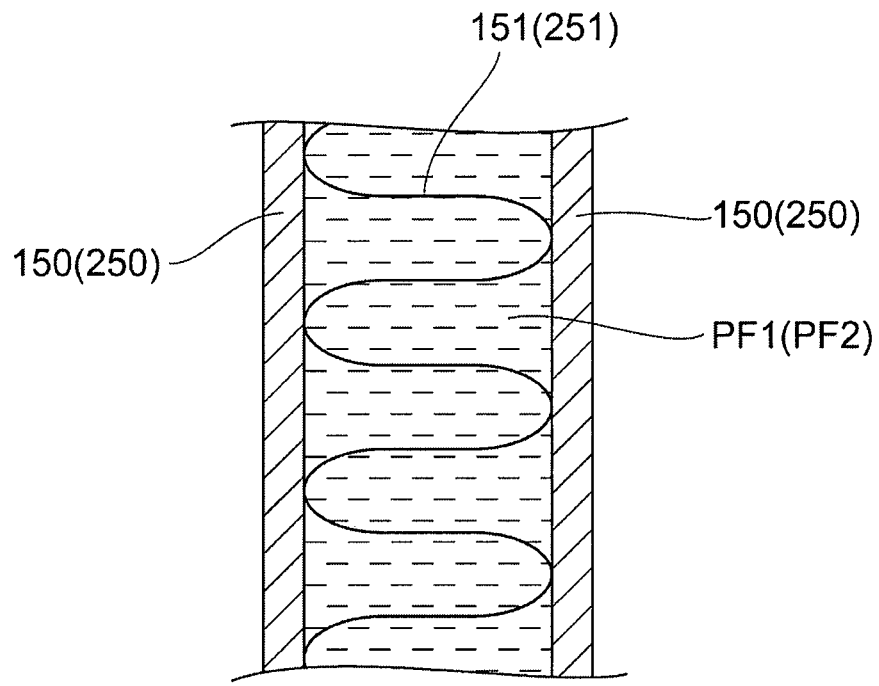

FIG. 6(A) shows a cross section of the cold storage container 150 and the first cold storage material PF1 stored in the cold storage container 150. A cross section of the cold storage container 250 and the second cold storage material PF2 stored in the cold storage container 250 is also the same as that shown in FIG. 6(A). For that reason, in FIG. 6(A), reference numerals indicating those components are indicated in parentheses. The same applies to FIG. 6(B) to be described next.

As in a modification shown in FIG. 6(B), an inner fin 151 for promoting a heat transfer to the first cold storage material PF1 may be accommodated inside the cold storage containers 150. Similarly, an inner fin 251 for promoting heat transfer to the second cold storage material PF2 may be accommodated in the inside of the cold storage container 250.

Figure 7:
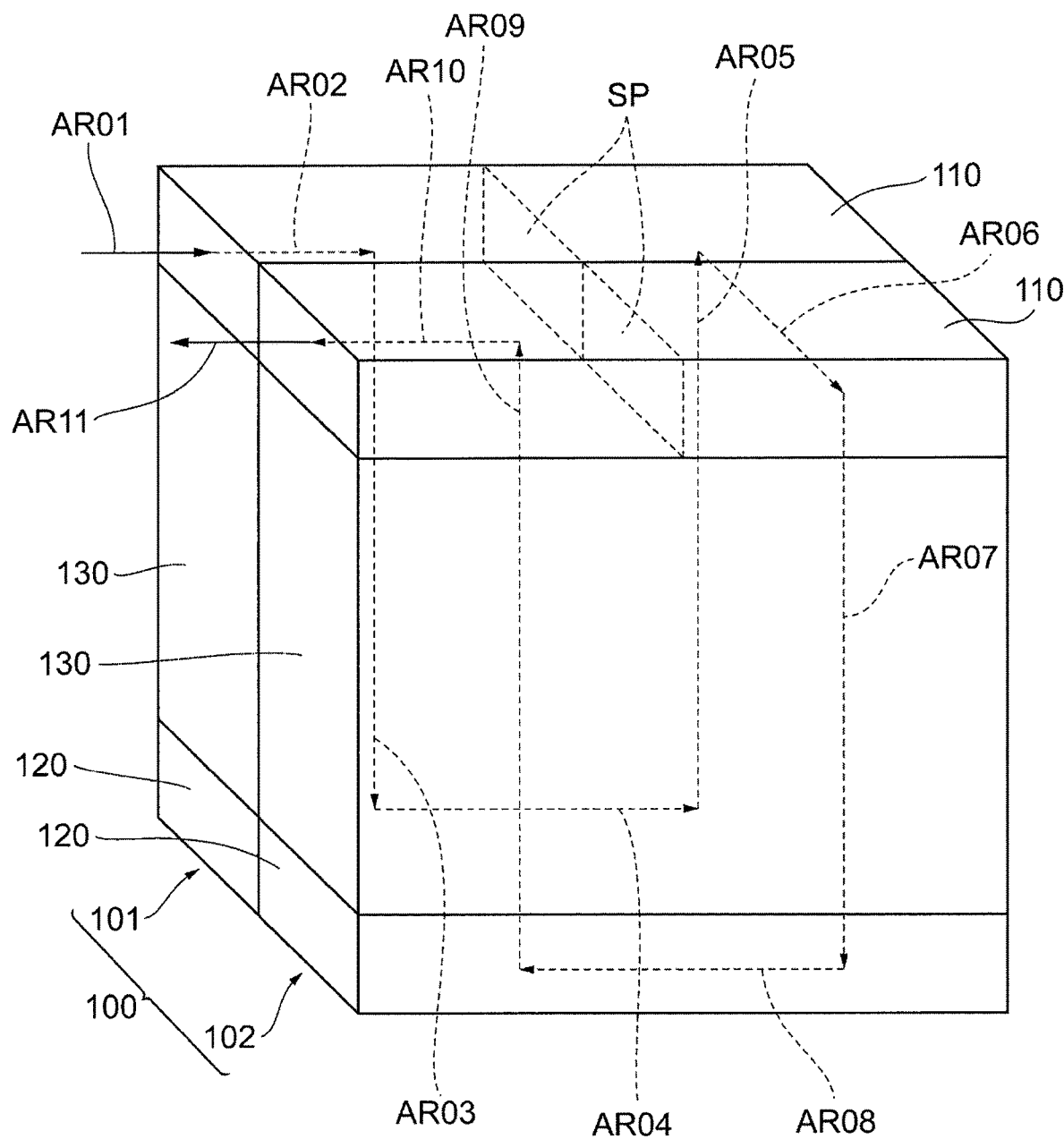
FIG. 7 is a diagram illustrating a path through which the refrigerant flows in the evaporator.

A path in which the refrigerant passes through the evaporator 100 configured by the first heat exchanging unit 101 and the second heat exchanging unit 102 will be described with reference to FIG. 7.

The refrigerant supplied to the evaporator 100 through the pipe 25 first flows into the upper tank 110 of the first heat exchanging unit 101 (arrow AR01). Thereafter, the refrigerant flows in the upper tank 110 along a longitudinal direction (arrow AR02) and flows into the multiple tubes 130 of the first heat exchanging unit 101.

An internal space of the upper tank 110 of the first heat exchanging unit 101 is divided into two spaces by the separator SP. For that reason, the refrigerant supplied to the evaporator 100 through the pipe 25 flows into only a portion of the upper tank 110 on a front side (left side in FIG. 7) of the separator SP, and does not flow into a portion on a rear side (right side in FIG. 7) of the separator SP.

The refrigerant flows inside the tubes 130 disposed on the front side of the separator SP toward the lower tank 120 of the first heat exchanging unit 101 (arrow AR03). The refrigerant flowing into the lower tank 120 flows inside the lower tank 120 along the longitudinal direction (arrow AR04) and flows into the tubes 130 disposed on the rear side of the separator SP. Thereafter, the refrigerant flows through the tubes 130 into a portion of the upper tank 110 of the first heat exchanging unit 101 on the rear side of the separator SP (arrow AR05).

A communication passage (not shown) is provided between the upper tank 110 of the first heat exchanging unit 101 and the upper tank 110 of the second heat exchanging unit 102. Internal spaces of the two tanks communicate with each other by the communication passage. The refrigerant flowing into the upper tank 110 of the first heat exchanging unit 101 passes through the communication passage and flows into the upper tank 110 of the second heat exchanging unit 102 (arrow AR06). Thereafter, the refrigerant flows into the multiple tubes 130 included in the second heat exchanging unit 102.

The internal space of the upper tank 110 of the second heat exchanging unit 102 is divided into two spaces by the separator SP, similarly to the case of the first heat exchanging unit 101. For that reason, the refrigerant flowing into the second heat exchanging unit 102 along the arrow AR06 flows into only the portion of the upper tank 110 of the second heat exchanging unit 102 at the rear side (right side in FIG. 7) of the separator SP and does not flow into the portion at the front side (left side in FIG. 7) of the separator SP.

The refrigerant flows through the inside of the tubes 130 disposed on the rear side of the separator SP toward the lower tank 120 of the second heat exchanging unit 102 (arrow AR07). The refrigerant flowing into the lower tank 120 flows through the inside of the lower tank 120 along the longitudinal direction (arrow AR08), and the refrigerant flows into the tubes 130 disposed on the front side of the separator SP. Thereafter, the refrigerant flows through the tubes 130 into a portion of the upper tank 110 of the second heat exchanging unit 102 on the front side of the separator SP (arrow AR09).

The refrigerant flowing into the upper tank 110 of the second heat exchanging unit 102 flows through the inside of the upper tank 110 toward the pipe 21 (arrow AR10), and finally, the refrigerant is discharged to the pipe 21 (arrow AR11). As described above, in the evaporator 100, the refrigerant flows through the insides of the first heat exchanging unit 101 and the second heat exchanging unit 102 while being folded back. The path through which the refrigerant flows in the evaporator 100 may be a path different from the path described above.

The refrigerant also flows through the inside of the cold storage unit 200 through the same path as described above. The refrigerant supplied from the pipe 21 to the cold storage unit 200 first flows into the upper tank 210 of the first heat exchanging unit 201, then flows back inside the first heat exchanging unit 201 and the second heat exchanging unit 202, and is finally discharged from the upper tank 210 of the second heat exchanging unit 202 to the pipe 22.

Functions of the cold storage containers 150 and the cold storage containers 250 will be described. When the compressor 30 is operating and the refrigerant is circulating in the circulation flow channel 20, both of the cold storage containers 150 and the cold storage containers 250 are cooled by the refrigerant. In the present embodiment, a melting point of the first cold storage material PF1 and a melting point of the second cold storage material PF2 are both higher than the temperature of the refrigerant at the time of circulation. Since the first cold storage material PF1 and the second cold storage material PF2 are cooled by the refrigerant having a temperature lower than the melting point of each of the first cold storage material PF1 and the second cold storage material PF2, the first cold storage material PF1 and the second cold storage material PF2 are finally solidified.

It is preferable that the degree of opening is adjusted by the expansion valve 50 to lower the degree of superheat of the refrigerant discharged from the cold storage unit 200 so that solidification of the first cold storage material PF1 or the like is performed in a short time.

Figure 8:
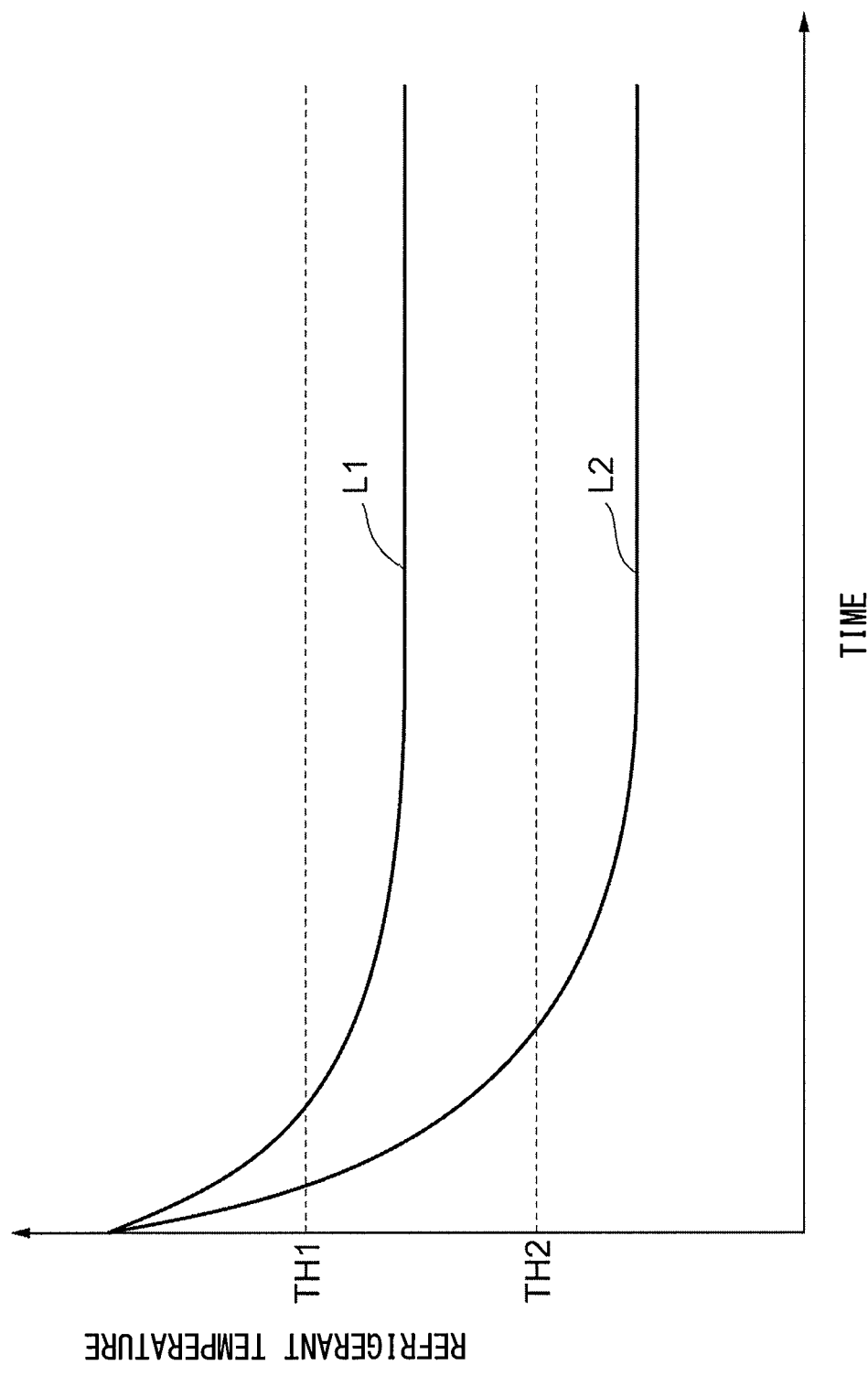
FIG. 8 is a graph showing a temperature change of the refrigerant circulating in a circulation flow channel.

A line L1 in FIG. 8 is a graph showing a temporal change in the temperature of the refrigerant passing through the evaporator 100 after the operation of the compressor 30 is started. A line L2 in FIG. 8 is a graph showing a temporal change in the temperature of the refrigerant passing through the cold storage unit 200 after the operation of the compressor 30 is started. As indicated by the lines L1 and L2, the temperature of the refrigerant passing through the cold storage unit 200 is lower than the temperature of the refrigerant passing through the evaporator 100. This is because the cold storage unit 200 is disposed at a position on the downstream side in the flow of the refrigerant, and the pressure of the refrigerant is lowered due to a pressure loss.

Symbol "TH1" shown in FIG. 8 is a melting point of the first cold storage material PF1. Hereinafter, the melting point is also referred to as "melting point TH1". Also, symbol "TH2" shown in FIG. 8 is a melting point of the second cold storage material PF2. Hereinafter, the melting point is also referred to as "melting point TH2". In the present embodiment, the melting point TH2 of the second cold storage material PF2 is lower than the melting point TH1 of the first cold storage material PF1.

In addition, the melting point TH1 of the first cold storage material PF1 is higher than the temperature (line L1) of the refrigerant passing through the evaporator 100 when the compressor 30 operates and reaches a steady state. Similarly, the melting point TH2 of the second cold storage material PF2 is higher than the temperature (line L2) of the refrigerant passing through the cold storage unit 200 when the compressor 30 operates and reaches a steady state. The melting point TH2 is lower than the temperature (line L1) of the refrigerant passing through the evaporator 100 when the compressor 30 operates and reaches a steady state.

Even if the circulation of the refrigerant is stopped due to, for example, an idle stop of the vehicle or the like after both of the first cold storage material PF1 and the second cold storage material PF2 have been solidified, the air is continuously fed to the evaporator 100 by the blower 301. Since the first cold storage material PF1 is solidified and the cold storage containers 150 are at a low temperature, the tubes 130 and the fins 140, which are adjacent to the cold storage material 150, are also at low temperatures. For that reason, after the air is cooled when passing through the evaporator 100, and the temperature of the air is lowered, the air is blown out into the vehicle interior as air conditioning wind. In other words, even after the operation of the compressor 30 is stopped, the vehicle interior is continuously cooled.

At this time, the heat from the air is added to the first cold storage material PF1. However, since the heat is used to melt the first cold storage material PF1, the temperature of the first cold storage material PF1 does not immediately rise, and is kept at a low temperature for a while. Thereafter, the first cold storage material PF1 dissolves, and the temperature of the first cold storage material PF1 gradually rises.

On the other hand, since the cold storage container 250 storing the second cold storage material PF2 is disposed outside the case 310, the heat applied from the air is relatively small. For that reason, even after the first cold storage material PF1 is dissolved, the second cold storage material PF2 remains solidified for a while.

In the above state, the refrigerant cooled by the cold storage container 250 moves from the cold storage unit 200 through the pipe 21 toward the evaporator 100. The low-temperature refrigerant supplied from the cold storage unit 200 to the evaporator 100 flows into the tubes 130 of the evaporator 100, and cools the tubes 130 and the fins 140. For that reason, even after the first cold storage material PF1 has been dissolved, the temperature of the tubes 130 and the fins 140 of the evaporator 100 does not rise immediately and remains low for a while. As a result, the vehicle interior is cooled for a longer period of time.

Figure 9:
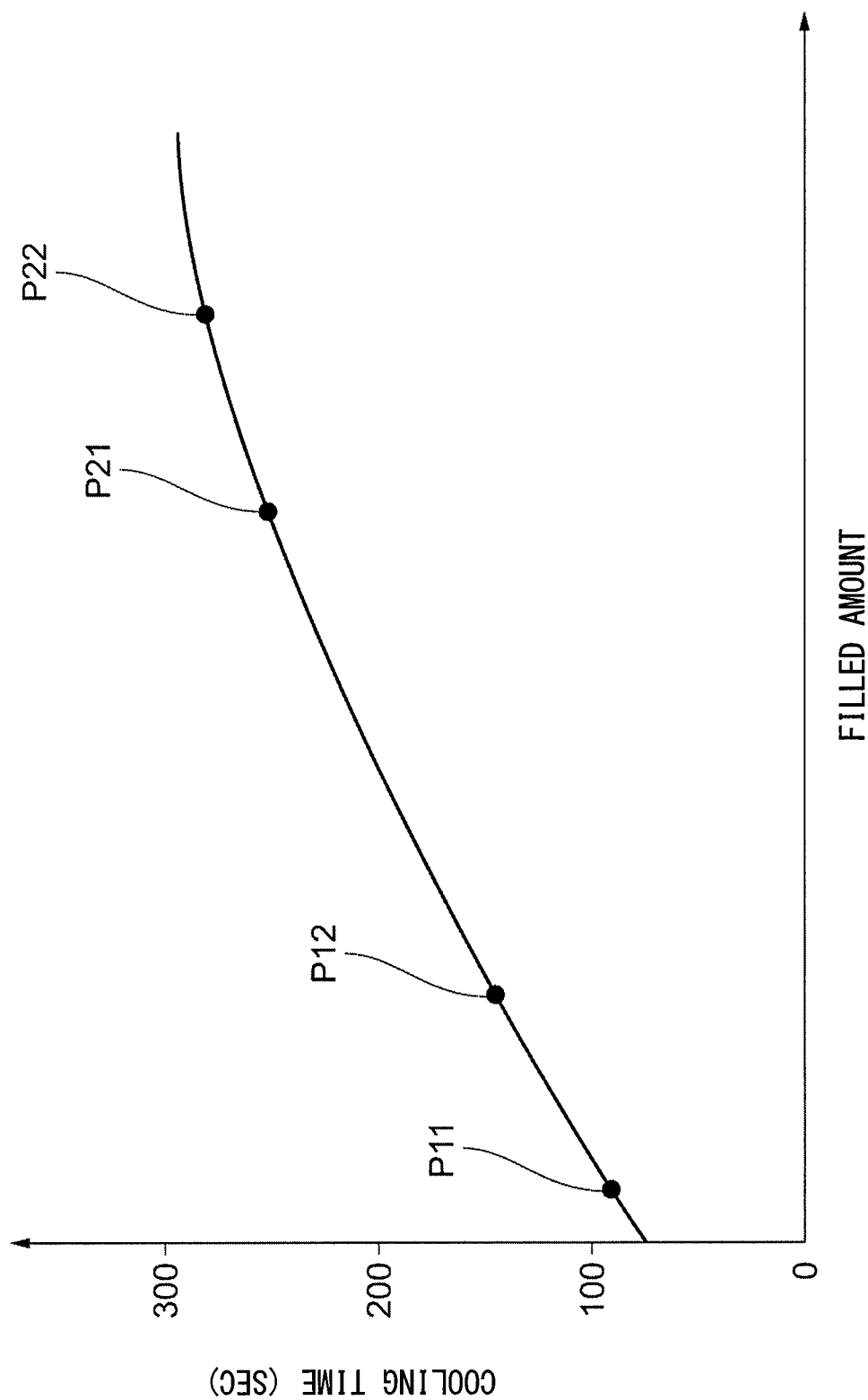
FIG. 9 is a graph showing a relationship between the amount of filled cold storage material and a cooling time in the evaporator.

FIG. 9 is a graph showing a relationship between the amount (filled amount) of the first cold storage material PF1 stored in the cold storage containers 150 of the evaporator 100 and a time (cooling time) during which the evaporator 100 can cool the air.

A point P11 in FIG. 9 shows the amount of filled material and a cooling time when the cold storage unit 200 is not provided and the occupation ratio of the cold storage material of the evaporator 100 is 10%. Further, a point P12 in FIG. 9 indicates the amount of filling and the cooling time when the cold storage unit 200 is not provided and the cold storage material occupation ratio of the evaporator 100 is 50%.

The cooling time at the point P 11 is about 90 seconds, and the cooling time at the point P12 is about 120 seconds. If the occupation ratio of the cold storage material is further higher than 50%, the cooling time can be further extended. However, in that case, the cooling performance of the evaporator 100 is remarkably deteriorated because the flow of air is obstructed by the cold storage containers 150. For that reason, it is impractical to set the occupation ratio of the cold storage material to be higher than 50%. In addition, if the evaporator 100 is increased in size after the occupation ratio of the cold storage material is made higher than 50%, the cooling performance of the evaporator 100 can be ensured. However, in view of the mountability of the evaporator 100 to the air conditioning mechanism 300, the configuration described above is still not practical.

A point P21 in FIG. 9 indicates a cooling time when the cold storage unit 200 is provided and the occupation ratio of the cold storage material of the evaporator 100 is 10% as in the present embodiment. Further, a point P22 in FIG. 9 indicates a cooling time when the cold storage unit 200 is provided as in the present embodiment and the occupation ratio of the cold storage material of the evaporator 100 is 50%.

The cooling time at the point P21 is about 250 seconds, and the cooling time at the point P22 is about 280 seconds. As described above, according to the present embodiment, a long cooling time exceeding 3 minutes can be realized without increasing the size of the evaporator 100 and while reducing the occupation ratio of the cold storage material to 50% or less. For that reason, the air in the evaporator 100 can be cooled while the internal combustion engine 60 is stopped, for example, during the entire period (about 3 minutes) in which unloading of the home delivery vehicle is performed.

The cold storage unit 200 may be disposed at a higher position than the evaporator 100. In other words, the cold storage container 250 which is the second cold storage unit may be disposed at a position above the cold storage container 150 which is the first cold storage unit. In the configuration described above, after the compressor 30 stops, a flow of the low-temperature refrigerant from the cold storage unit 200 toward the evaporator 100 is further promoted, and the cooling of the air in the evaporator 100 is performed more efficiently.

As described with reference to FIG. 8, in the present embodiment, the melting point TH2 of the second cold storage material PF2 is lower than the melting point TH1 of the first cold storage material PF1. For that reason, after the compressor 30 stops, a low-temperature refrigerant having a temperature close to the melting point TH2 is supplied from the cold storage unit 200 to the evaporator 100, and a lower-temperature air conditioning wind is blown out into the vehicle interior. This makes it possible to keep the vehicle interior more comfortable. Further, when the melting point TH2 of the second cold storage material PF2 is low, there is an advantage that the second cold storage material PF2 is hardly left to melt.

Conversely, the melting point TH2 of the second cold storage material PF2 may be higher than the melting point TH1 of the first cold storage material PF1. In the configuration described above, the second cold storage material PF2 can be solidified more quickly when the compressor 30 is operating. In addition, the second cold storage material PF2 can be solidified reliably even when the outside air temperature is high.

In the present embodiment, the cold storage unit 200 is provided in addition to the evaporator 100. For that reason, a capacity of a space occupied by both of the evaporator 100 and the cold storage unit 200 is increased by approximately 1.6 times as compared with the prior art in which the cold storage unit 200 is not provided.

However, it has been confirmed by the present inventors that, if the cooling performance similar to that of the present embodiment is obtained by increasing the occupation ratio of the cold storage material of the evaporator 100 without providing the cold storage unit 200, the capacity of the space occupied by the evaporator 100 must be increased by about four times as much as the conventional volume. In other words, in the present embodiment, with the additional provision of the cold storage unit 200, a high cooling performance is realized while minimizing an increase in volume.

In the present embodiment, the cold storage container 250, which is the second cold storage unit, is provided at a position different from the evaporator 100 in the circulation flow channel 20, specifically, at a position on the downstream side of the evaporator 100 in the circulation flow channel 20. Instead of the configuration described above, a configuration may be employed in which the cold storage container 250 is provided at a position on the upstream side of the evaporator 100. In other words, the positions of the evaporator 100 and the cold storage unit 200 in FIG. 1 may be interchanged with each other. Even in the above configuration, the same advantages as those of the present embodiment can be obtained.

Further, although the occupancy rate of the cold storage material in the cold storage unit 200 in the present embodiment is 100%, the occupancy rate of the cold storage material in the cold storage unit 200 may be smaller than 100%. For example, a heat exchanger having a configuration similar to that of the evaporator 100 (a configuration including the fins 140) may be used as the cold storage unit 200. In that case, it is preferable that the occupation ratio of the cold storage material in the cold storage unit 200 is set to 50% or more.

Since freezing of the condensed water is relatively unlikely to occur in the cold storage unit 200, there is no need to perform the frost control as described above. Therefore, the refrigerant having a temperature lower than 0° C. can be supplied to the cold storage unit 200. As a result, the second cold storage material PF2 can be solidified in a short period of time (that is, the cold storage is completed). In the present embodiment, the amount of the second cold storage material PF2 stored in all of the cold storage containers 250 is larger than the amount of the first cold storage material PF1 stored in all of the cold storage containers 150, but solidification of the second cold storage material PF2 does not become the limiting rate for the reason described above.

A modification of the first embodiment will be described with reference to FIG. 10. This modification differs from the first embodiment only in the shape of the cold storage containers 150, and is otherwise the same as the first embodiment. Hereinafter, only a configuration different from the first embodiment will be described, and a description of configurations common to the first embodiment will be appropriately omitted.

Figure 10:
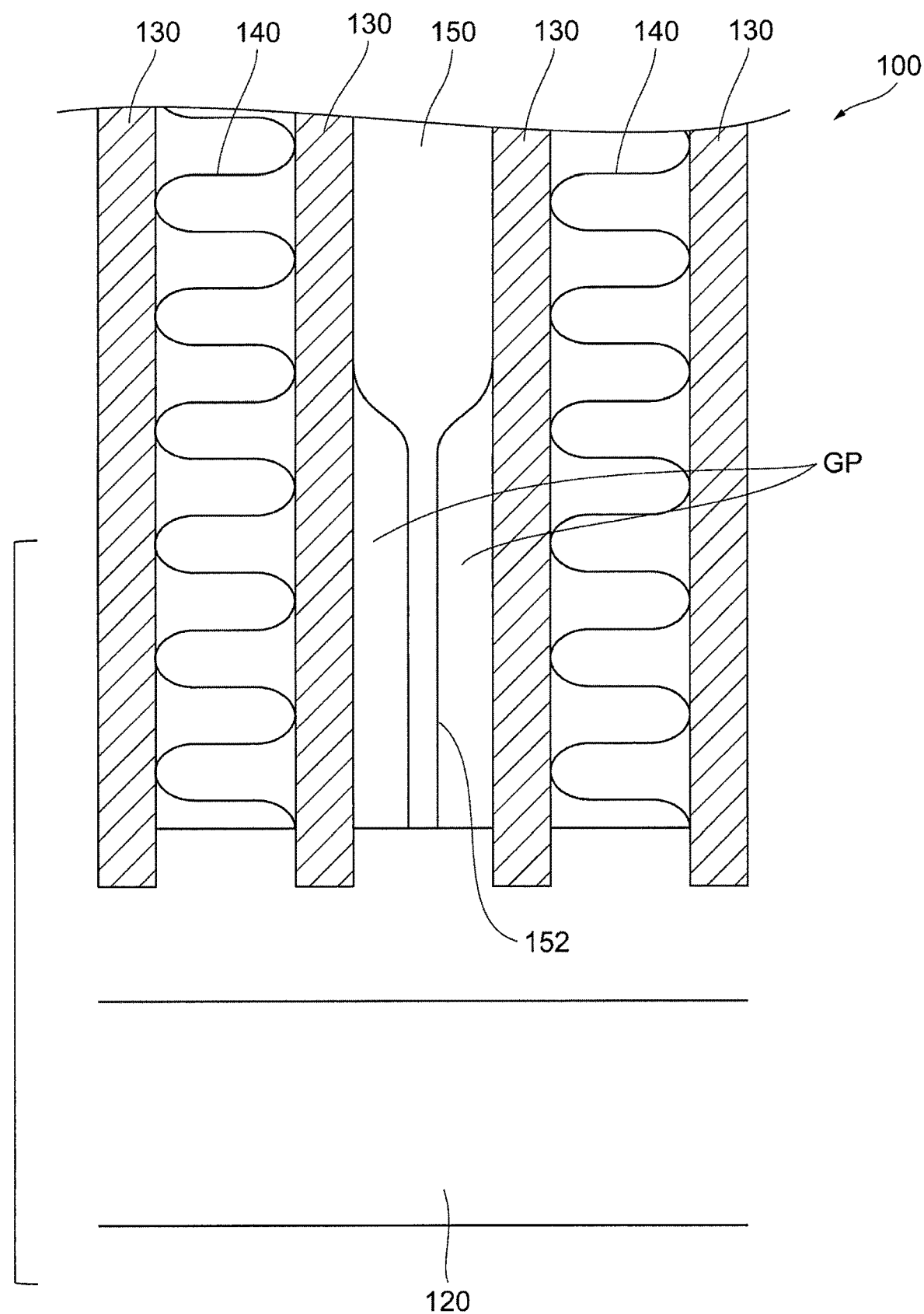
FIG. 10 is a diagram showing a configuration of an evaporator according to a modification of the first embodiment.

As shown in FIG. 10, in the present modification, a lower portion of the cold storage container 150, that is, a portion in the vicinity of the lower tank 120, serves as a freezing countermeasure portion 152. In the freezing countermeasure portion 152, a width of the cold storage container 150 in the freezing countermeasure part 152 (a dimension in a left-right direction in FIG. 10) is narrower than the width in other portions. In addition, the first cold storage material PF1 is stored only in a portion above the freezing countermeasure portion 152, and is not stored inside the freezing countermeasure portion 152. In the freezing countermeasure portion 152, the cold storage containers 150 and the tubes 130 do not come in contact with each other, and a gap GP is provided between the cold storage containers 150 and the tubes 130.

In a surface of the evaporator 100, in particular, a lower portion of the tubes 130 and the cold storage containers 150, freezing of the condensed water is likely to occur due to rapid cooling of the air containing humidity. If freezing of the condensed water occurs between the tubes 130 and the cold storage containers 150, deformation or breakage of the tubes 130 may occur due to a volume expansion of the condensed water during freezing.

Therefore, in the present modification, the freezing countermeasure portion 152 is provided in a portion of the cold storage containers 150 where freezing is apt to occur. Since the gap GP is provided in the freezing countermeasure portion 152, even if freezing of the condensed water occurs, spaces between the tubes 130 and the cold storage containers 150 are not spread by ice. For that reason, the tubes 130 and the like are prevented from being damaged due to freezing.

On the other hand, in the cold storage unit 200, since heat exchange with the air containing humidity is not performed, freezing on the surface of the tubes 130 or the like is relatively unlikely to occur. Therefore, there is no need to provide such a freezing countermeasure portion. Since the second cold storage material PF2 can be stored entirely in the cold storage container 250 in the longitudinal direction, the cold storage can be performed by effectively utilizing a limited space.

Figure 11:
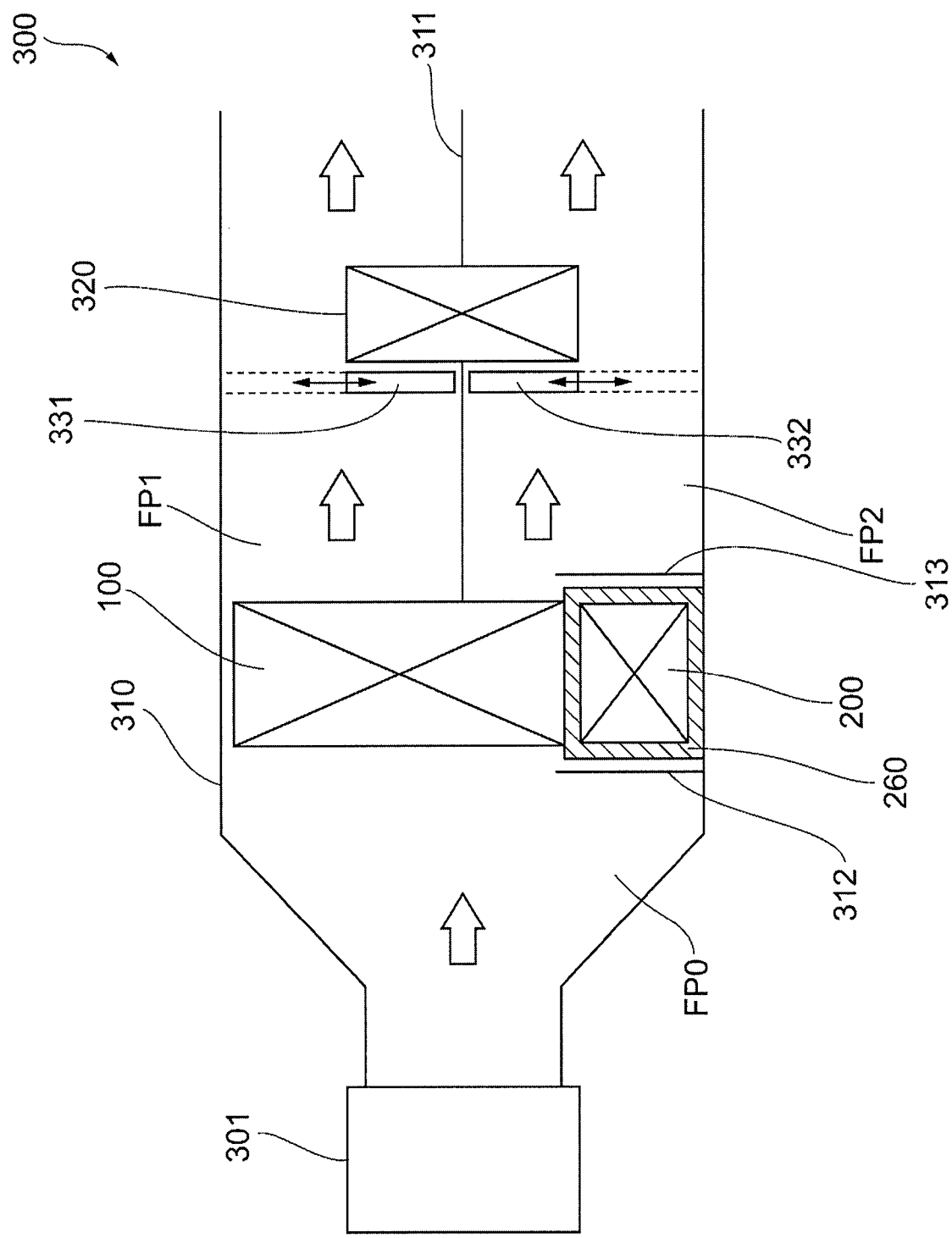
FIG. 11 is a diagram showing a specific configuration of an air conditioning mechanism included in an air conditioner according to a second embodiment.

A second embodiment will be described with reference to FIG. 11. Hereinafter, only the configurations of the second embodiment different from the first embodiment will be described, and a description of the configurations common to the first embodiment will be appropriately omitted.

In the present embodiment, a dimension of an evaporator 100 in a height direction is smaller than that in the first embodiment. Also, a cold storage unit 200 is disposed inside, not outside, of a case 310, and is specifically disposed at a position just below the evaporator 100.

The case 310 is provided with windproof walls 312 and 313. The windproof wall 312 is a wall formed at a position on the upstream side of the cold storage unit 200 along a flow direction of air. When viewed from the upstream side along the flow direction of the air, the entire cold storage unit 200 is covered with the windproof wall 312. For that reason, all of the air flowing through a flow channel FP0 flows into the evaporator 100, and the air does not flow into the position where the cold storage unit 200 is disposed.

The windproof wall 313 is a wall formed at a position on the downstream side of the cold storage unit 200 along the flow direction of the air. When viewed from the downstream side along the flow direction of the air, the entire cold storage unit 200 is covered with the windproof wall 313. For that reason, the air that has passed through the evaporator 100 does not reach the cold storage unit 200 in a flow channel FP2.

Further, in the present embodiment, the entire periphery of the cold storage unit 200 is covered with a moisture proof material 260. In the present embodiment, such a configuration further prevents air containing moisture from reaching the cold storage unit 200, and freezing of the condensed water is prevented from occurring on the surface of the cold storage unit 200. As the moisture proof material 260, for example, a resin such as vinyl can be used. Instead of the moisture proof material 260, the periphery of the cold storage unit 200 may be covered with a heat insulating material. As a result, the cooling performance of the cold storage unit 200 is further enhanced, and cooling after the internal combustion engine 60 is stopped can be performed for a longer period of time. As the heat insulating material, for example, a sheet made of a foamable resin or the like can be used.

Instead of the moisture proof material 260, the periphery of the cold storage unit 200 may be covered with a vibration proof material. As a result, since the vibration of the cold storage unit 200 is reduced, the cold storage unit 200 can be prevented from being damaged or the like due to the vibration. As the vibration proof material, for example, a packing made of rubber can be used.

Further, the periphery of the cold storage unit 200 may be covered with a plurality of members among a heat insulating material, a moisture proof material, and a vibration proof material. The configuration described above can also be adopted in the case where the cold storage unit 200 is disposed outside the case 310 as in the first embodiment.

In the present embodiment, since the size of the evaporator 100 is smaller than that of the first embodiment, the cold storage performance of the cold storage containers 150 is also lower. However, because of the advantages of the provision of the cold storage unit 200, a long cooling time after the internal combustion engine 60 stops can be secured for a long period of time, as compared with the conventional configuration. If the cooling time is equivalent to the conventional time, the air conditioner 10 can be further miniaturized by further reducing the number of the cold storage containers 150 or further miniaturizing the cold storage unit 200.

Further, in the configuration in which the cold storage unit 200 is disposed adjacent to the evaporator 100 as in the present embodiment, the pipe 21 connecting the evaporator 100 to the cold storage unit 200 is set to be shorter and the overall layout can be simplified.

The present embodiment has been described above with reference to the specific examples. However, the present disclosure is not limited to those specific examples. Those specific examples subjected to an appropriate design change by those skilled in the art are also encompassed in the scope of the present disclosure as long as the changed examples have the features of the present disclosure. Each element included in each of the specific examples described above and the placement, condition, shape, and the like of each element are not limited to those illustrated, and can be changed as appropriate. Each element included in each of the above-described specific examples can be appropriately combined together as long as there is no technical contradiction.

What is claimed is:

1. An air conditioner comprising:
a circulation flow channel in which a refrigerant circulates;
an evaporator provided in the circulation flow channel to cool air by heat exchange with the refrigerant passing through the circulation flow channel, the evaporator configured to cool air to be blown into a compartment;
a first cold storage unit that is provided in the evaporator at a position adjacent to a tube in which the refrigerant flows in the evaporator, and is configured to store therein a first cold storage material which changes in phase by the heat exchange with the refrigerant passing through the tube;
a second cold storage unit that is provided in the circulation flow channel at a position different from the evaporator, and is configured to store therein a second cold storage material which changes in phase by the heat exchange with the refrigerant passing through the circulation flow channel; and
an expansion valve provided to reduce a pressure of the refrigerant at a position on an upstream side of the evaporator in the circulation flow channel, wherein
the second cold storage unit is provided in the circulation flow channel at a position on a downstream side of the evaporator,
an opening degree of the expansion valve is configured to increase as a temperature of the refrigerant in the circulation flow channel at a position on a downstream side of the second cold storage unit increases,
the evaporator and the first cold storage unit provided in the evaporator are disposed in a case to cool the air flowing through the evaporator in the case, and
the second cold storage unit is disposed at a position outside the case.

2. The air conditioner according to claim 1, wherein an amount of the second cold storage material stored in the second cold storage unit is larger than an amount of the first cold storage material stored in the first cold storage unit.

3. The air conditioner according to claim 1, wherein a melting point of the second cold storage material is lower than a melting point of the first cold storage material.

4. The air conditioner according to claim 1, wherein a periphery of the second cold storage unit is covered with at least one of a moisture proof material, a heat-insulating material, or a vibration proof material.

5. The air conditioner according to claim 1, wherein the second cold storage unit is disposed at a position above the first cold storage unit.

6. The air conditioner according to claim 1, wherein the first cold storage unit accommodates a first cold storage material and the second cold storage unit accommodates a second cold storage material.

7. The air conditioner according to claim 6, wherein the first cold storage material and the second cold storage material are paraffin.

8. The air conditioner according to claim 1, wherein the second cold storage unit includes a first heat exchanging unit and a second heat exchanging unit.

9. The air conditioner according to claim 1, wherein the second cold storage unit is separate and independent from the evaporator.

10. The air conditioner according to claim 1, wherein the second cold storage unit is disposed at a position outside an area being cooled.

* * * * *